United States Patent [19]

Murata et al.

[11] Patent Number: 5,563,236
[45] Date of Patent: Oct. 8, 1996

[54] RESIN COMPOSITION FOR COATING

[75] Inventors: Hiroshi Murata; Hiroshi Tachika; Hiroshi Fujimoto, all of Ohtsu, Japan

[73] Assignee: Toyo Boseki Kabushiki Kaisha, Japan

[21] Appl. No.: 391,321

[22] Filed: Feb. 21, 1995

Related U.S. Application Data

[63] Continuation of Ser. No. 943,316, Sep. 10, 1992, abandoned.

[30] Foreign Application Priority Data

Sep. 12, 1991 [JP] Japan .................................. 3-262924

[51] Int. Cl.$^6$ .................................................. C08G 63/688
[52] U.S. Cl. .................... 528/295; 528/293; 528/300; 528/302; 528/307; 528/308; 528/308.6; 525/437; 525/438; 525/440; 525/441; 524/335; 524/356; 524/364
[58] Field of Search ........................... 528/272, 293, 528/295, 300, 302, 307, 308, 308.6; 525/437, 438, 440, 441; 524/335, 356, 364

[56] References Cited

U.S. PATENT DOCUMENTS 4,340,519  7/1982  Kotera et al. .......................... 523/414

FOREIGN PATENT DOCUMENTS

| 53-2546 | 1/1978 | Japan . |
| 53-2536 | 1/1978 | Japan . |
| 57-57746 | 4/1982 | Japan . |
| 63-108081 | 5/1988 | Japan . |
| 2-56375 | 11/1990 | Japan . |

*Primary Examiner*—Samuel A. Acquah
*Attorney, Agent, or Firm*—Leydig, Viot & Mayer, Ltd.

[57] ABSTRACT

A resin composition for coating of the present invention includes a polyester containing an acid component and a polyol component, wherein the polyester is soluble or dispersible in a solvent consisting essentially of at least one solvent selected from the group consisting of cyclohexanone and isophorone; the polyester has a metal sulfonate group in an amount in the range of 0.1 to 5 mol % based on the total moles of the acid component or the polyol component and is slightly soluble in an organic solvent in the case where the content of the metal sulfonate group is 0%; and a specific gravity of the polyester at 30° C. is in the range of 1.265 to 1.340.

13 Claims, No Drawings

RESIN COMPOSITION FOR COATING

This is a Continuation of application Ser. No. 07/943,316 filed Sep. 10, 1992, now abandon.

BACKGROUND OF THE INVENTION

1. Field of the Invention

The present invention relates to a resin composition for coating capable of forming a coating film which is excellent in formability, staining resistance and hardness, and has an external appearance excellent in gloss and vividness.

2. Description of the Prior Art

As resins contained in resin compositions for coating which have been used in recent years, there are alkyd resins, vinyl resins, and silicone resins. These resins are used for solvent type coatings, aqueous dispersion coatings and powdery coatings. However, coating films formed by using coatings containing these resins do not have satisfactory properties such as gloss and vividness of the external appearance, formability, staining resistance, and hardness.

Japanese Laid-Open Patent Publication Nos. 57-57746 and 63-108081 disclose resin compositions for coating capable of forming coating films which have excellent formability and high hardness; however, their formability and hardness are not sufficient. Japanese Laid-Open Patent Publication No. 53-2536 and Japanese Patent Publication No. 2-56375 disclose the introduction of a metal sulfonate group into a resin (polyester) for coating for the purpose of improving pigment dispersibility of the coating. A coating film formed by using a composition containing this type of resin for coating is excellent in gloss and vividness; however, the coating film is poor in density and staining resistance since the polyester contained in the composition is substantially soluble in organic solvents easily and has a low specific gravity of such as 1.265 or less. In the case where the glass transition temperature of the polyester is 40° C. or more, a coating film obtained has relatively satisfactory hardness, however the toughness thereof is not sufficient since the specific gravity of the polyester is less than 1.265 (at 30° C.), resulting in poor formability.

In general, in order to obtain a resin composition capable of forming a coating film which has satisfactory formability by using a solvent soluble polyester, it is required that the glass transition temperature of the polyester be 20° C. or less. The coating film obtained by using this type of resin composition is soft and the hardness thereof is not satisfactory. On the other hand, a coating film with high hardness does not have sufficient formability. A coating film obtained by using this type of resin composition containing a solvent soluble polyester has an external appearance excellent in gloss, however the staining resistance thereof is poor. In contrast, a coating film obtained by a powdery coating using a resin composition containing a polyester with a specific gravity of 1.265 or more which is slightly soluble in organic solvents is excellent in formability and staining resistance and has high hardness. However, this type of composition is slightly soluble in organic solvents, so that the composition should be coated in a powdery state. As a result, the surface of the coating film obtained is rough, and the gloss and vividness thereof are poor. Moreover, in the case where the resin composition containing this type of polyester is coated in a powdery state, the, line speed is remarkably decreased compared with the case where the resin composition containing a solvent soluble type resin is coated. Furthermore, it takes much time to prepare a composition which can develop a desired color by using this type of polyester which is slightly soluble in organic solvents.

SUMMARY OF THE INVENTION

The resin composition for coating of this invention, comprises a polyester containing an acid component and a polyol component, wherein the polyester is soluble or dispersible in a solvent consisting essentially of at least one solvent selected from the group consisting of cyclohexanone and isophorone; the polyester has a metal sulfonate group in an amount in the range of 0.1 to 5 mol % based on the total moles of the acid component or the polyol component and is slightly soluble in an organic solvent in the case where the content of the metal sulfonate group is 0%; and a specific gravity of the polyester at 30° C. is in the range of 1.265 to 1.340.

Thus, the invention described herein makes possible the advantages of (1) providing a resin composition for coating capable of forming a coating film excellent in formability; (2) providing a resin composition for coating capable of forming a coating film which has an external appearance excellent in gloss and vividness, excellent staining resistance, and high hardness; and (3) providing a resin composition for coating suitable for use in a primer for a metal substrate, various kinds of coatings, adhesive for metal, and a binder.

DESCRIPTION OF THE PREFERRED EMBODIMENTS

The resin composition for coating of the present invention comprises a polyester containing an acid component and a polyol component. The polyester has a metal sulfonate group in an amount in the range of 0.1 to 5 mol % based on the total moles of the acid component or the polyol component. In the case where the content of the metal sulfonate group is 0%, the polyester is slightly soluble in an organic solvent.

It is preferred that the polyester contains terephthalic acid and other aromatic dicarboxylic acids in an amount in the range of 60 to 80 mol % and 20 to 40 mol % based on the total moles of the acid component, respectively. In the case where the content of the terephthalic acid is less than 60 mol % based on the total moles of the acid component, the toughness of a polyester obtained may be decreased, and the formability of a coating film formed by using this polyester may be decreased. As to the polyester, either one of the following cases is preferred: (1) 50 to 80 mol % of ethylene glycol, 0 to 30 mol % of diethylene glycol, and 5 to 50 mol % of propylene glycol are contained based on the total moles of the glycol component, and the sum of the moles of the ethylene glycol and the diethylene glycol is in the range of 50 to 85 mol %; (2) 50 to 80 mol % of ethylene glycol and 5 to 40 mol % of 1,4-cyclohexanedimethanol are contained, and the sum of the moles of the ethylene glycol and 1,4-cyclohexanedimethanol is 80 mol % or more; and (3) 70 to 90 mol % of diethylene glycol and 5 to 30 mol % of 1,4-butanediol are contained, and the sum of the moles of the diethylene glycol and 1,4-butanediol is 80 mol % or more.

Examples of the acid component other than terephthalic acid include aromatic dicarboxylic acids such as isophthalic acid, orthophthalic anhydride, and 2,6-naphthalenedicarboxylic acid; aliphatic dicarboxylic acids such as succinic acid, glutaric acid, adipic acid, sebacic acid, and dodecandicarboxylic acid; and allcyclic dicaroboxylic acids such as 1,2-cyclohexanedicarboxylic acid, 1,3-cyclohexanedicarboxylic acid, and 1,4-cyclohexanedicarboxylic acid. In addition, polyvalent carboxylic acids such as trimellitic acid and pyromellitic acid can be used in combination with the above-mentioned dicarboxylic acid as long as the properties of a coating film obtained are not deteriorated.

Examples of the polyol component other than ethylene glycol include diethylene glycol, propylene glycol, 1,3-propanediol, 1,4-butanediol, 1,5-pentanediol, neopentyl glycol, 1,6-hexanediol, 2-butyl-2-ethylpropanediol, and 1,4-cyclohexanedimethanol. In view of the physical properties of a coating film obtained, ethylene glycol, diethylene glycol, 1,4-cyclohexanedimethanol, 1,4-butanediol, and 1,6-hexanediol are preferred. A great amount of neopentyl glycol causes the specific gravity of a polyester obtained to decrease, exerting adverse effects on the staining resistance of a coating film formed by using the polyester. Accordingly, in the case where neopentyl glycol is used, the content thereof should be 30 mol % or less, preferably less than 5 mol % based on the total moles of the polyol component. In addition, polyvalent polyols such as trimethylol ethane, trimethylol propane, glycerin, end pentaerythritol can be used in combination with the above-mentioned polyol component as long as the properties of a coating film obtained do not deteriorate.

The polyester used in the resin composition for coating of the present invention is soluble or dispersible in a specific solvent containing cyclohexane and/or leophotons described later. When the polyester is prepared so that the content of a metal sulfonate group described later is 0%, the polyester is slightly soluble in organic solvents. Accordingly, the kind and amount of the acid component and the polyol component are selected so that when they are polymerized to prepare a polyester without using a monomer having a metal sulfonate group, the polyester is slightly soluble in an organic solvent. A coating film, which is formed by using a composition of the present invention comprising a polyester containing those components, has excellent staining resistance. Moreover, in this case, the formability of the coating film obtained is satisfactory and the hardness thereof is high. The term "organic solvent" in the present specification refers to an organic solvent used in an ordinary composition for coating. Examples of this solvent include methyl ethyl ketone, cyclohexanone, isophorone, toluene, xylene, Solvesso 100 (Exxon Chemical Co., Ltd.), Solvesso 150 (Exxon Chemical Co., Ltd.), ethyl acetate, butyl acetate, cellosolve, carbitol, cellosolve acetate, and carbitol acetate. The term "slightly soluble" means that the solubility in a solvent at a temperature in the vicinity of room temperature (10° to 35° C.) is less than 10% by weight. The term "soluble" or "dispersible" means that when a polyester is dissolved or dispersed in a solvent in a concentration of 10% by weight or more, the solution or the dispersion is stable at the above-mentioned temperatures.

The polyester used in the present invention has a metal sulfonate group. Because of this, the solubility of the polyester in an organic solvent is improved, and a coating film obtained by using this polyester maintains satisfactory staining resistance and excellent gloss and vividness. The polyester having a metal sulfonate group can be obtained by the following method: In addition to the above-mentioned acid component and polyol component, an acid component or a polyol component having a metal sulfonate group is used to produce a polyester. Examples of the acid component having a metal sulfonate group include a metal salt of acids such as sulfoterephthalic acid, 5-sulfoisophthalic acid, 4-sulfonaphthalene-2,7-dicarboxylic acid, and 5(4-sulfophenoxy)isophthalic acid. Examples of metal constituting the metal salt include Li, Na, K, Mg, Ca, Cu, and Fe. Examples of the polyol component having a metal sulfonate group include metal salts of 2-sulfo-1,4-butanediol, 2,5-dimethyl-3-sulfo-2,5-hexanediol, and the like. A particularly preferred compound among the acid components and the polyol components having a metal sulfonate group is 5-sodium sulfoisophthalate. It is desirable that the acid (or polyol) component having a metal sulfonate group is contained in an amount in the range of 0.1 to 5 mol % (calculated in terms of the number of the metal sulfonate groups) based on the total moles of the acid (or polyol) components. In the case where the content of the metal sulfonate group is less than 0.1 mol %, the polyester does not have sufficient solubility in an organic solvent. In the case where the content thereof is more than 5 mol %, the water resistance of a coating film obtained is decreased.

The polyester used in the present invention is produced by an ordinary method such as the direct method or the transesterification method, using the above-mentioned acid component end polyol component, and the acid component and/or polyol component having a metal sulfonate group.

The specific gravity (at 30° C.) of the polyester used in the present invention is in the range of 1.265 to 1.340, preferably in the range of 1.280 to 1.320. In the case where the specific gravity of the polyester is less than 1.265, the cohesion of the resin is decreased, and the formability and staining resistance of a coating film obtained by using the polyester is decreased.

It is preferred that the glass transition temperature of the polyester used in the present invention is in the range of 40° to 85° C. In the case where the glass transition temperature is less than 40° C., the hardness of a coating film obtained tends to decrease; and in the case where the glass transition temperature is more than 85° C., the formability tends to decrease.

In view of the formability of a coating film obtained, the reduced viscosity of the polyester used in the present invention is preferably in the range of 0.25 to 1.0 dl/g, more preferably in the range of 0.40 to 0.65 dl/g.

The polyester used in the present invention is soluble or dispersible in a solvent consisting essentially of at least one solvent selected from the group consisting of cyclohexanone and isophorone. As a solvent used for preparing a coating by dissolving or dispersing each component of the composition of the present invention, cyclohexanone and/or isophorone are preferred. Other organic solvents can be mixed as long as the solubility of the polyester in the solvent does not deteriorate.

If necessary, a crosslinking agent is contained in the resin composition for coating of the present invention. In the case where the crosslinking agent is contained, it is preferred that the ratio of the polyester to the crosslinking agent is in the range of 95:5 to 70:30 (weight ratio). In the case where the ratio of the polyester is more than 95% by weight, the hardness and staining resistance of a coating film obtained tend to decrease; and in the case where the ratio thereof is less than 70% by weight, the formability of a coating film obtained tends to decrease.

As the above-mentioned crosslinking agent, a crosslinking agent capable of reacting with the polyester used in the present invention can be used. Examples of the crosslinking agent include alkyl etherificated aminoformaldehyde resin, an epoxy compound, and an isocyanate compound.

The alkyl etherificated aminoformaldehyde resin is a condensation product of formaldehyde or paraformaldehyde which is etherificated by alcohol having 1 to 4 carbon atoms (e.g., methanol, ethanol, n-propanol, iso-propenol, and n-butanol) and an amino compound such as urea, N,N-ethylene urea, dicyanodiamide, aminotriazine, etc. More specifically, examples of the condensation product include methoxylated methylol-N,N-ethylene urea, methoxylated methyloldicyanodiamide, methoxylated methylolbenzoguanamine, butoxylated methylolbenzoguanamine, methoxylated methylolmelamine, butoxylated methylolmelamine, methoxylated/butoxylated mixed type methylolmelamine, and butoxylated methylolbenzoguenamine. In view of the formability of a coating film formed by using a polyester which is the above-mentioned condensation product, methoxylated methylolmelamine, butoxylated methylolmelamine, or methoxylated/butoxylated mixed type methylolmelamine is preferred. These compounds can be used alone or in combination.

Examples of the epoxy compound used as the crosslinking agent include diglycidyl ether of hisphenol A and oligomers thereof, diglycidyl ether of hydrogenated hisphenol A and oligomers thereof, orthophthalic acid diglycidyl ester, isophthalic acid diglycidyl ester, terephthalic acid diglycidyl ester, p-oxybenzoic acid diglycidyl ester, tetrahydrophthalic acid diglycidyl ester, hexahydrophthalic acid diglycidyl ester, succinic acid diglycidyl ester, adipic acid diglycidyl ester, sebacic acid diglycidyl ester, ethylene glycol diglycidyl ether, propylene glycol diglycidyl ether, 1,4-butanediol diglycidyl ether, 1,6-hexanediol diglycidyl ether, polyalkylene glycol diglycidyl ethers, trimellitic acid triglycidyl ester, triglycidyl isocyanurate, 1,4-diglycidytoxybenzene, diglycidylpropylene urea, glycerol triglycidyl ether, trimethylol ethane triglycidyl ether, trimethylol propane triglycidyl ether, pentaerythritol tetraglycidyl ether, and triglycidyl ether of glycerol alkylene oxide adducts.

As the isocyanate compound used as the cross-linking agent, aromatic or aliphatic diisocyanate, and trivalent or more-valent polyisocyanate can be used. As the isocyanate compound, either low molecular weight or high molecular weight compounds can be used. Examples of the isocyanate compound include tetramethylene diisocyanate, hexamethylene diisocyanate, toluene diisocyanate, diphenylmethane diisocyanate, hydrogenated diphenylmethane diisocyanate, xylylene diisocyanate, hydrogenated xylylene diisocyanate, isophorone diisocyanate, and the trimers thereof. Further, included are isocyanate-terminated compounds obtained by reacting an excess amount of the above-mentioned isocyanate compounds with low molecular active hydrogen compounds; high molecular active hydrogen compounds such as various polyester polyols, polyether polyols, and polyamides; and the like. Examples of the above low molecular active compound include ethylene glycol, propylene glycol, trimethylol propane, glycerin, sorbitol, ethylenediamine, monoethanolamine, diethanolamine, and triethanolamine.

The isocyanate compound can be blocked isocyanate. Examples of the blocking agent of isocyanate include phenols such as phenol, thiophenol, methylthiophenol, ethylthiophenol, cresol, xylenol, resorcinol, nitrophenol and chlorophenol; oximes such as acetoxime, methyl ethyl ketoxime and cyclohexanone oxime; primary alcohols such as methanol, ethanol, propanol and butanol; halogen-substituted alcohols such as ethylenechlorohydrin and 1,3-dichloro-2-propanol; tertiary alcohols such as t-butanol and t-pentanol; and lactams such as ε-caprolactam, δ-valerolactam, γ-butyrolactam and β-propylolactam. As the blocking agent, aromatic amines; imides; active methylene compounds such as acetylacetone, acetoacetic acid esters, and malonic acid ethyl ester; mercaptans; imines; ureas; diaryl compounds; and sodium bisulfite are also preferably used. Blocked isocyanate can be obtained by effecting the addition reaction between the isocyanate compound and the blocking agent in accordance with an appropriate conventional known method.

A coating according to the present invention comprises the above-mentioned polyester, solvent, and if necessary, crosslinking agent. Moreover, if necessary, the coating comprises various kinds of additives such as a hardener, a reaction accelerator, pigments (e.g., titanium oxide), glass fiber, silica, and wax. A coating is formed by an ordinary method using a mixer such as a roll kneader, a ball mill, or a blender.

A substrate such as a steel plate is coated with the coating and baked, and thus a coating film is formed on the substrate. The coating film thus obtained has sufficient properties. In order to further improve corrosion resistance, a primer coating containing an epoxy resin, a polyester resin, or the like can be used. As a method for coating, roller coating (by hand or by using a machine), spray coating, electro-static coating, or the like is appropriately selected. The baking temperature during the formation of the coating film is arbitrarily selected based on the size and thickness of the substrate, capacity of the baking furnace, hardenability of the coating, etc.

The polyester used in the present invention has a higher glass transition temperature, 40° C. or more, compared with conventional solvent soluble polyesters which have high formability. The polyester is slightly soluble in an organic solvent in the case where the content of the metal sulfonate group is 0%. Usually, the polyester contains a greater amount of polyethylene terephthalate component. Such a polyester has high cohesion properties, and therefore, the formability of a coating film obtained is excellent and the hardness thereof is high. In general, as the content of the polyethylene terephthalate is increased, the solubility of the polyester in a solvent is remarkably decreased. However, according to the present invention, the introduction of a metal sulfonate group enhanced the solubility, whereby a coating film with an excellent external appearance can be formed. In the case where it is desired to improve formability without decreasing staining resistance, a polyester slightly soluble in an organic solvent having Tg of less than 40° C., preferably 25° C. or less and a specific gravity (at 30° C.) of 1.265 or more can be mixed with the resin composition for coating of the present invention.

The resin composition of the present invention which contains the polyester and a solvent can be used as a coating, an adhesive, or the like. Especially, the composition further containing a known hardener can preferably be used as an adhesive for various kinds of base plates (e.g., plastic films such as a polyethyleneterephthalate film and metal plates such as an iron plate and a tin plate). In the coating or adhesive, a mixture of the polyester and the hardener serves as a binder resin for binding pigments, etc.

EXAMPLES

Hereinafter, the present invention will be described by way of illustrating examples. Polyesters and resin compositions for coating in the following examples and comparative examples are evaluated by the following test method.

(1) Reduced viscosity η sp/c (dl/g)

First, 0.10 g of each polyester obtained in the following production examples was dissolved in 25 ml of mixed solvent of phenol/tetrachloroethane (in a volume ratio of 6:4). Then, the viscosity of the solution at 30° C. was measured and the reduced viscosity was calculated.

(2) Glass transition temperature

Each polyester obtained in the following production examples was measured for glass transition temperature by means of a differential scanning calorimeter (DSC) at an increasing temperature rate of 20° C./min. Each sample was put in a container with an aluminum presser lid in an amount of 5 mg and crimped.

(3) Specific gravity

A block of each polyester obtained in the following production examples was immersed in an aqueous solution of potassium chloride with a predetermined concentration at 30° C. After thoroughly stirring, the concentration of the potassium chloride was regulated so that the polyester block may not float or sink and stay still in the aqueous solution of potassium chloride (when the polyester block floats, the aqueous solution was diluted and when the polyester block sinks, the concentration of the aqueous solution was increased). Then, the specific gravity of the aqueous solution of potassium chloride was measured by an ordinary method and defined as the specific gravity of the polyester.

(4) Solubility

Each polyester obtained in the following production examples was dissolved by heating in cyclohexanone so as to give 30% solid content, and allowed to stand at room temperature. Five days later, the state of the solution was observed (○, ○-Δ, and Δ show satisfactory states).

○: Transparent solution

○-Δ: Opaque solution

Δ: Suspension in which the polyester was uniformly dispersed

Δ-×: Suspension in which the polyester was ununiformly dispersed

×: Gel in a pudding form (5) Hardness

Each coating obtained in the following examples was coated onto the surface of a steel plate, and the coated surface was measured for hardness in accordance with JIS K 5400 by using a pencil stipulated in JIS S 6006.

(6) Formability

The formability was evaluated by the following method. First, a steel plate was bent with the coated surface thereof outside and was checked to see whether cracks were formed or not at the bent portion. When cracks were not formed, the evaluation was made OT. When cracks were formed, a new coated steel plate was prepared. Then, the same test as above was performed so that one sheet of steel plate with the same thickness as that of the above coated steel plate was sandwiched between the bent steel plate. When cracks were not formed, the evaluation was made 1T. When cracks were formed, a new coated steel plate was prepared. Then the same test as above was performed so that two sheets of steel plates with the same thickness as that of the above coated steel plate was sandwiched between the bent steel plate. When cracks were not formed, the evaluation was made 2T. In this way, the number of the steel plates in which cracks were not formed was checked by increasing the number of the steel plates for insertion.

(7) Staining resistance

Each coating obtained in the following examples was coated onto the surface of a steel plate, a line was written on the coated surface with red marking ink. A half of the line was covered with a transparent adhesive tape and allowed to stand for two hours. After that, the red marking ink on the coated surface was wiped out with ethanol, and the trace of erased marking ink is evaluated by comparing with the red marking ink under the transparent adhesive tape. The evaluation was made by five grades.

(5: No trace remained, 1: Completely clear trace remained)

(8) Gloss

Each coated surface formed by using the coatings obtained in the following examples was measured for reflectivity at an angle of 60°.

(9) Water resistance

Each coating obtained in the following examples was coated onto the surface of a steel plate, and the coated steel plate was immersed in boiling water for two hours. Then, the coated surface was measured for reflectivity at an angle of 60° and the gloss retention was calculated by the following expression:

Gloss retention (%) = (post-treatment gloss)/(initial gloss) × 100

Production Example 1

Synthesis of Polyester (A)

First, a reactor equipped with a stirrer, a condenser and a thermometer was charged with 620.8 parts by weight of dimethyl terephthalate, 339.5 parts by weight of dimethyl isophthalate, 14.8 parts by weight of dimethyl-5-sodium sulfoisophthalate, 558 parts by weight of ethylene glycol, 144 parts by weight of 1,4-cyclohexanedimethanol, and 0.51 parts by weight of tetrabutyl titanate, and the mixture was gradually heated from 160° C. to 220° C. over 4 hours to effect transesterification. Then, the atmospheric pressure of the mixture was gradually reduced to 5 mmHg over 40 minutes, and the mixture was subjected to condensation polymerization under reduced pressure of 0.3 mmHg or less at 260° C. for 60 minutes. The polyester (A) thus obtained was subjected to composition analysis by NMR, etc. The results indicate that the molar ratios of the acid components and polyol components are as follows: terephthalic acid/isophthalic acid/5-sodium sulfoisophthalate=64/35/1; and ethylene glycol/1,4-cyclohexanedimethanol=75/25. The reduced viscosity was measured to be 0.45 dl/g, and the glass transition temperature was 66° C.

Production Examples 2 to 20

Synthesis of Polyesters (B) to (S)

Each of polyesters (B) to (S) having compositions as shown in Table 1 or 2 was synthesized in a similar manner as in the synthesis of polyester (A). Polyesters (I) to (S) shown in Table 2 have compositions other than those used in the present invention.

TABLE 1

| Components (mol %) | Polyester resin | | | | | | | |
| --- | --- | --- | --- | --- | --- | --- | --- | --- |
| | A | B | C | D | E | F | G | H |
| Acid components | | | | | | | | |
| Terephthalic acid | 64 | 64 | 64 | 64 | 70 | 69 | 65 | 80 |
| Isophthalic acid | 35 | 34 | 30 | 34 | 28.5 | 28 | 24 | 0 |
| Orthophthalic acid | 0 | 0 | 0 | 0 | 0 | 0 | 0 | 18 |
| Trimellitic acid | 0 | 1 | 0 | 1.5 | 0 | 0 | 0 | 1 |
| Sebacic acid | 0 | 0 | 5 | 0 | 0 | 0 | 0 | 0 |
| 1,2-Cyclohexanedicarboxylic acid | 0 | 0 | 0 | 0 | 0 | 0 | 10 | 0 |
| 5-Sodium sulfoisophthalic acid | 1 | 1 | 1 | 0.5 | 1.5 | 3 | 1 | 1 |
| Polyol components | | | | | | | | |
| Ethylene glycol | 75 | 60 | 75 | 70 | 70 | 70 | 70 | 0 |

TABLE 1-continued

| Components (mol %) | Polyester resin | | | | | | | |
|---|---|---|---|---|---|---|---|---|
| | A | B | C | D | E | F | G | H |
| 1,4-Cyclohexanedi-methanol | 25 | 0 | 0 | 20 | 0 | 30 | 0 | 0 |
| Neopentyl glycol | 0 | 0 | 3 | 0 | 0 | 0 | 0 | 0 |
| Propylene glycol | 0 | 25 | 22 | 0 | 0 | 0 | 30 | 0 |
| 1,6-Hexanediol | 0 | 0 | 0 | 0 | 30 | 0 | 0 | 0 |
| 1,4-Butanediol | 0 | 0 | 0 | 0 | 0 | 0 | 0 | 18 |
| Diethylene glycol | 0 | 15 | 0 | 10 | 0 | 0 | 0 | 82 |
| Reduced viscosity (dl/g) | 0.45 | 0.61 | 0.65 | 0.56 | 0.45 | 0.52 | 0.51 | 0.53 |
| Glass transition temperature (°C.) | 66 | 62 | 48 | 59 | 42 | 68 | 62 | 15 |
| Specific gravity | 1.295 | 1.300 | 1.300 | 1.295 | 1.305 | 1.295 | 1.300 | 1.298 |
| Solubility in cyclohexanone | ○-Δ | ○ | ○ | Δ | ○ | ○ | ○ | ○ |

TABLE 2

| Components (mol %) | Polyester resin | | | | | | | | | | |
|---|---|---|---|---|---|---|---|---|---|---|---|
| | I* | J* | K* | L* | M* | N* | O* | P* | Q* | R* | S* |
| Acid components | | | | | | | | | | | |
| Terephthalic acid | 65 | 64 | 65 | 70 | 50 | 70 | 49 | 67 | 40 | 80 | 49 |
| Isophthalic acid | 35 | 35 | 30 | 30 | 40 | 29 | 39 | 24 | 60 | 0 | 25 |
| Orthophthalic acid | 0 | 0 | 0 | 0 | 0 | 0 | 0 | 0 | 0 | 20 | 0 |
| Trimellitic acid | 0 | 1 | 0 | 0 | 0 | 0 | 0 | 1 | 0 | 0 | 0 |
| Sebacic acid | 0 | 0 | 5 | 0 | 10 | 0 | 10 | 0 | 0 | 0 | 25 |
| 1,2-Cyclohexanedi-carboxylic acid | 0 | 0 | 0 | 0 | 0 | 0 | 0 | 0 | 0 | 0 | 0 |
| 5-Sodium sulfo-isophthalic acid | 0 | 0 | 0 | 0 | 0 | 1 | 2 | 8 | 0 | 0 | 1 |
| Polyol components | | | | | | | | | | | |
| Ethylene glycol | 75 | 60 | 75 | 40 | 40 | 40 | 40 | 72 | 74 | 0 | 50 |
| 1,4-Cyclohexanedi-methanol | 25 | 0 | 0 | 0 | 0 | 0 | 0 | 28 | 26 | 0 | 0 |
| Neopentyl glycol | 0 | 0 | 3 | 50 | 50 | 50 | 50 | 0 | 0 | 0 | 40 |
| Propylene glycol | 0 | 25 | 22 | 0 | 0 | 0 | 0 | 0 | 0 | 0 | 0 |
| 1,6-Hexanediol | 0 | 0 | 0 | 0 | 0 | 0 | 0 | 0 | 0 | 0 | 0 |
| 1,4-Butanediol | 0 | 0 | 0 | 0 | 0 | 0 | 0 | 0 | 0 | 18 | 0 |
| Diethylene glycol | 0 | 15 | 0 | 10 | 10 | 10 | 10 | 0 | 0 | 82 | 10 |
| Reduced viscosity (dl/g) | 0.53 | 0.65 | 0.61 | 0.58 | 0.54 | 0.60 | 0.62 | 0.45 | 0.49 | 0.60 | 0.60 |
| Glass transition temperature (°C.) | 65 | 62 | 48 | 64 | 43 | 64 | 43 | 44 | 64 | 15 | 13 |
| Specific gravity | 1.295 | 1.300 | 1.300 | 1.255 | 1.251 | 1.255 | 1.251 | 1.292 | 1.285 | 1.298 | 1.220 |
| Solubility in cyclohexanone | X | X | X | ○ | ○ | ○ | ○ | ○ | ○-Δ | X | ○ |

*The compositions of Polyester resin (I) to (S) are different from those of the polyesters used in the present invention.

EXAMPLE 1

First, 27.6 parts by weight of titanium oxide, 5.6 parts by weight of methyl/butyl etherificated methylolmelamine (Trade name: Cymel 254, solid content 80%, manufactured by Mitsui-Cyanamid, Ltd.), 0.75 parts by weight of 10% benzyl alcohol solution of p-toluenesulfonic acid, and 0.15 parts by weight of Polyflow-S (Trade name) (manufactured by Kyoeisha Chemical Co., Ltd.) were added to a solution containing 100 parts by weight of polyester (A). Then, the above-mentioned components were dispersed in the solvent by a glass bead type high-speed disperser for five hours to obtain a coating.

The coating was coated onto a zinc steel plate with a thickness of 0.5 mm so that the dry film thickness be 20 μm, and the plate was baked at 230° C. for 1 minute. The test results of the coated steel plate are shown in Table 3. In Table 3, the amount of each component in the coating is represented as parts by weight in terms of solid content.

EXAMPLES 2 TO 13

Each of coatings was prepared in a similar way as in Example 1 using components shown in Table 3. The amount of each component was shown in Table 3. Each coating was coated onto a steel plate and the resulting steel plate was baked. The test results of the coated steel plates are shown in Table 3. In Table 3, the amount of each component in the coating is represented as parts hy weight in terms of solid content.

TABLE 3

| Components (parts by weight) | Examples | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Polyester resin | A 100 | A 100 | B 100 | B 100 | C 100 | D 100 | E 100 | F 100 | G 100 | H 100 | A 70 H 30 | B 80 H 20 | B 100 |
| Aminoformaldehyde resin a) | 15 | 0 | 15 | 0 | 20 | 15 | 15 | 15 | 15 | 20 | 15 | 15 | 25 |
| Blocked isocyanate b) | 0 | 25 | 0 | 0 | 0 | 0 | 0 | 0 | 0 | 0 | 0 | 0 | 0 |
| Epoxy resin c) | 0 | 0 | 0 | 10 | 0 | 0 | 0 | 0 | 0 | 0 | 0 | 0 | 0 |
| Titanium dioxide | 92 | 100 | 92 | 88 | 96 | 92 | 92 | 92 | 92 | 96 | 92 | 92 | 0 |
| p-Toluenesulfonic acid | 0.25 | 0 | 0.25 | 0 | 0.25 | 0.25 | 0.25 | 0.25 | 0.25 | 0.25 | 0.25 | 0.25 | 0.25 |
| Dibutyltindilaurate | 0 | 0.5 | 0 | 0 | 0 | 0 | 0 | 0 | 0 | 0 | 0 | 0 | 0 |
| Imidazole d) | 0 | 0 | 0 | 3 | 0 | 0 | 0 | 0 | 0 | 0 | 0 | 0 | 0 |
| Poly flow-s | 0.5 | 0.5 | 0.5 | 0.5 | 0.5 | 0.5 | 0.5 | 0.5 | 0.5 | 0.5 | 0.5 | 0.5 | 0.2 |
| Physical properties of coating film | | | | | | | | | | | | | |
| Surface hardness | 2H | H | 2H | 2H | H | H | 2H | 2H | 2H | H | 2H | 2H | F |
| Formability | 1T | 1T | 1T | 1T | 0T | 0T | 1T | 1T | 1T | 0T | 0T | 0T | 0T |
| Staining resistance | 4 | 3 | 5 | 4 | 4 | 4 | 5 | 5 | 4 | 3 | 4 | 5 | 4 |
| Gloss (%) | 90 | 87 | 92 | 89 | 90 | 91 | 92 | 94 | 90 | 88 | 91 | 88 | 90 |
| Resistance to boiling water (Gloss retention %) | 95 | 93 | 95 | 96 | 93 | 92 | 93 | 95 | 91 | 92 | 93 | 90 | 90 | a) Cymel 254 (manufactured by Mitsui-Cyanamid Co., Ltd.)
b) IPDI B1530 (manufactured by Daicel Hulse Co., Ltd.)
c) EPICOTE 1007 (Yuka Shell Epoxy Co., Ltd.)
d) 2MZ (manufactured by Shikoku Chemicals Co., Ltd.)

Comparative Examples 1 to 13

Each of the coatings was prepared in a similar way as in Example 1 using components shown in Table 4. The amount of each component is also shown in Table 4. Each coating was coated onto a steel plate and the resulting steel plate was baked. The test results of the coated steel plates are shown in Table 4. In Table 4, the amount of each component in the coating is represented as parts by weight in terms of solid content. In Comparative Examples 1, 2, 3 and 10, the resins obtained were not dispersible, so that the physical properties of the coating films could not be measured.

Various other modifications will be apparent to and can be readily made by those skilled in the art without departing from the scope and spirit of the invention. Accordingly, it is not intended that the scope of the claims appended hereto be limited to the description as set forth herein, but rather that the claims be broadly construed.

What is claimed is:

1. A resin composition for coating comprising a polyester, wherein said polyester has a polyester backbone having a solubility at 10° C. to 35° C. in cyclohexanone of less than 10% by weight,

TABLE 4

| Components (parts by weight) | Comparative Examples | | | | | | | | | | | | |
|---|---|---|---|---|---|---|---|---|---|---|---|---|---|
| | 1 | 2 | 3 | 4 | 5 | 6 | 7 | 8 | 9 | 10 | 11 | 12 | 13 |
| Polyester resin | I 100 | J 100 | K 100 | L 100 | M 100 | N 100 | O 100 | P 100 | Q 100 | R 100 | S 100 | A 100 | B 80 S 20 |
| Aminoformaldehyde resin a) | 15 | 15 | 15 | 15 | 15 | 15 | 15 | 15 | 15 | 15 | 20 | 60 | 15 |
| Titanium dioxide | 92 | 92 | 92 | 92 | 92 | 92 | 92 | 92 | 92 | 92 | 96 | 128 | 92 |
| p-Toluenesulfonic acid | 0.25 | 0.25 | 0.25 | 0.25 | 0.25 | 0.25 | 0.25 | 0.25 | 0.25 | 0.25 | 0.25 | 0.25 | 0.25 |
| Poly flow-s | 0.5 | 0.5 | 0.5 | 0.5 | 0.5 | 0.5 | 0.5 | 0.5 | 0.5 | 0.5 | 0.5 | 0.5 | 0.5 |
| Physical properties of coating film | | | | | | | | | | | | | |
| Surface hardness | — | — | — | 2H | H | 2H | H | 2H | H | — | F | 2H | H |
| Formability | — | — | — | 5T | 5T | 5T | 5T | 2T | 5T | — | 0T | 5T | 2T |
| Staining resistance | — | — | — | 1 | 1 | 1 | 1 | 4 | 3 | — | 1 | 5 | 2 |
| Gloss (%) | — | — | — | 90 | 85 | 88 | 87 | 92 | 88 | — | 90 | 88 | 35 |
| Resistance to boiling water (Gloss retention %) | — | — | — | 88 | 85 | 85 | 83 | 15 | 90 | — | 72 | 96 | 89 | a) Cymel 254 (manufactured by Mitsui-Cyanamid Co., Ltd.)

wherein said backbone is formed from acid components and polyol components, said acid components comprising terephthalic acid and at least one other aromatic dicarboxylic acid, said terephthalic acid being present in an amount ranging from 60 to 80 mol % and said other aromatic dicarboxylic acid being present in an amount ranging from 20 to 40 mol % based on the total number of moles of said acid components, said polyol components comprising diethylene glycol and 1,4-butanediol in an amount in the range of 70 to 90 mol % and 5 to 30 mol % based on the total number of moles of said polyol components, respectively, and the sum of the moles of said diethylene glycol and 1,4-butanediol is 80 mol % or more, said polyester comprising a metal sulfonate group as a substituent of said acid components or said polyol components, said metal sulfonate group being present in an amount ranging from 0.1 to 5 mol % based on the total moles of said acid components or said polyol components, and said polyester is soluble or dispersible in a solvent selected from the group consisting of cyclohexanone, isophorone, and mixture thereof, and possesses a specific gravity at 30° C. in the range of 1,265 to 1,340.

2. A resin composition for coating, comprising a polyester, wherein said polyester has a polyester backbone having a solubility at 10° C. to 35° C. in cyclohexanone of less than 10% by weight, wherein said backbone is formed from acid components and polyol components, said acid components comprising terephthalic acid and at least one other aromatic dicarboxylic acid, said terephthalic acid being present in an amount ranging from 60 to 80 mol % and said other aromatic dicarboxylic acid being present in an amount ranging from 20 to 40 mol % based on the total number of moles of said acid components, said polyol components comprising ethylene glycol and at least one other glycol, said ethylene glycol being present in an amount ranging from 50 to 80 mol % based on the total number of moles of said polyol components, said polyester comprising a metal sulfonate group as a substituent of said acid components or said polyol components, said metal sulfonate group being present in an amount ranging from 0.1 to 5 mol % based on the total moles of said acid components or said polyol components, and wherein said polyester is soluble or dispersible in a solvent selected from the group consisting of cyclohexanone, isophorone, and mixtures thereof, and possesses a specific gravity at 30° C. in the range of 1.280 to 1,320.

3. A resin composition for coating according to claim 2, wherein said metal sulfonate group is present as a substituent of said other aromatic dicarboxylic acid.

4. A resin composition for coating according to claim 2, wherein said polyol components comprise ethylene glycol, diethylene glycol, and propylene glycol in an amount in the range of 50 to 80 mol %, 0 to 30 mol %, and 5 to 50 mol % based on the total moles of the glycol component, respectively, and the sum of the moles of the ethylene glycol and the diethylene glycol is in the range of 50 to 85 mol %.

5. A resin composition for coating according to claim 2, wherein said polyol components comprises ethylene glycol and 1,4-cyclohexanedimethanol in an amount in the range of 50 to 80 mol % and 5 to 40 mol % based on the total number of moles of the glycol component, respectively, and the sum of the moles of the ethylene glycol and 1,4-cyclohexanedimethanol is 80 mol % or more.

6. A resin composition for coating, comprising a polyester, wherein said polyester has a polyester backbone having a solubility at 10° C. to 35° C. in cyclohexanone of less than 10% by weight, wherein said backbone is formed from acid components and polyol components, said acid components comprising terephthalic acid and at least one other aromatic dicarboxylic acid, said terephthalic acid being present in an amount ranging from 60 to 80 mol % and said other aromatic dicarboxylic acid being present in an amount ranging from 20 to 40 mol % based on the total number of moles of said acid components, said polyester comprising a metal sulfonate group as a substituent of said acid components or said glycol, said metal sulfonate group being present in an amount ranging from 0.1 to 5 mol % based on the total moles of said acid components or said polyol components, and wherein said polyester is soluble or dispersible in a solvent selected from the group consisting of cyclohexanone, isophorone, and mixtures thereof, and possesses a specific gravity at 30° C. in the range of 1.265 to 1.340.

7. A resin composition for coating according to claim 6, wherein said polyol components comprise diethylene glycol and 1,4-butanediol in an amount in the range of 70 to 90 mol % and 5 to 30 mol % based on the total number of moles of said polyol components, respectively, and the sum of the moles of said diethylene glycol and 1,4-butanediol is 80 mol % or more.

8. A resin composition for coating according to claim 6, wherein said polyol components comprise ethylene glycol and at least one other glycol, said ethylene glycol being present in an amount ranging from 50 to 80 mol % based on the total number of moles of said polyol components.

9. A resin composition for coating according to claim 6, wherein said polyester possesses a specific gravity at 30° C. in the range of 1.280 to 1.320.

10. A resin composition for coating comprising a polyester, wherein said polyester has a polyester backbone having a solubility at 10° to 35° C. in cyclohexanone of less than 10% by weight, wherein said backbone is formed from acid components and polyol components, said acid components comprising terephthalic acid and at east one other aromatic dicarboxylic acid, said terephthalic acid being present in an amount ranging from 60 to 80 mol % and raid other aromatic dicarboxylic acid being present in an amount ranging from 20 to 40 mol % based on the total number of moles of said acid components, said polyol components comprising ethylene glycol, diethylene glycol, and propylene glycol in an amount in the range of 50 to 80 mol %, 0 to 30 mol %, and 5 to 50 mol % based on the total moles of the glycol component, respectively, and wherein the sum of the moles of the ethylene glycol and the diethylene glycol is in the range of 50 to 85 mol %, wherein said polyester comprises a metal sulfonate group as a substituent of said acid components or said polyol components, said metal sulfonate group being present in an amount ranging from 0.1 to 5 mol % based on the total moles of said acid components or said polyol components, and wherein said polyester is soluble or dispersible in a solvent selected from the group consisting of cyclohexanone, isophorone, and mixtures thereof, and possesses a specific gravity at 30° C. in the range of 1.265 to 1.340.

11. A resin composition for coating comprising a polyester, wherein said polyester has a polyester backbone having a solubility at 10° to 35° C. in cyclohexanone of less than 10% by weight, wherein said backbone is formed from acid components and polyol components, said acid components comprising terephthalic acid and at least one other aromatic dicarboxylic acid, said terephthalic acid being present in an amount ranging from 60 to 80 mol % and said other aromatic dicarboxylic acid being present in an amount ranging from 20 to 40 mol % based on the total number of moles of said acid components, said polyol components comprising ethylene glycol and 1,4-cyclohexanedimethanol in an amount in the range of 50 to 80 mol % and 5 to 40 mol % based on the total number of moles of the glycol component, respectively, and wherein the sum of the moles of the ethylene glycol and 1,4-cyclohexanedimethanol is 80 mol % or more, said polyester comprising a metal sulfonate group as a substituent of said acid components or said polyol components, said metal sulfonate group being present in an amount ranging from 0.1 to 5 mol % based on the total moles of said acid components or said polyol components, and wherein said polyester is soluble or dispersible in solvent selected from the group consisting of cyclohexanone, isophorone, and mixtures thereof, and possesses a specific gravity at 30° C. in the range of 1,265 to 1,340.

12. A resin composition for coating, comprising a polyester, wherein said polyester has a polyester backbone having a solubility at 10° to 35° C. in cyclohexanone of less than 10% by weight, wherein said backbone is formed from acid components and polyol components, said acid components comprising terephthalic acid and at least one other aromatic dicarboxylic acid, said terephthalic acid being present in an amount ranging from 60 to 80 mol % and said other aromatic dicarboxylic acid being present in an amount ranging from 20 to 40 mol % based on the total number of moles of said acid components, said polyol components comprising ethylene glycol, diethylene glycol, and propylene glycol in an amount in the range of 50 to 80 mol %, 0 to 30 mol %, and 5 to 50 mol % based on the total moles of the glycol component, respectively, and wherein the sum of the moles of the ethylene glycol and the diethylene glycol is in the range of 50 to 85 mol %, said polyester comprising a metal sulfonate group as a substituent of said acid components or said polyol components, said metal sulfonate group being present in an amount ranging from 0.1 to 5 mol % based on the total moles of said acid components or said polyol components, and wherein said polyester is soluble or dispersible in a solvent selected from the group consisting of cyclohexanone, isophorone, and mixtures thereof, and possesses a specific gravity at 30° C. in the range of 1.280 to 1.320.

13. A resin composition for coating, comprising a polyester, wherein said polyester has a polyester backbone having a solubility at 10° to 35° C. in cyclohexane of less than 10% by weight, wherein said backbone is formed from acid components and polyol components, said acid components comprising terephthalic acid and at least one other aromatic dicarboxylic acid, said terephthalic acid being present in an amount ranging from 60 to 80 mol % and said other aromatic dicarboxylic acid being present in an amount ranging from 20 to 40 mol % based on the total number of moles of said acid components, said polyol components comprising ethylene glycol and 1,4-cyclohexanedimethanol in an amount in the range of 50 to 80 mol % and 5 to 40 mol % based on the total number of moles of the glycol component, respectively, and wherein the sum of the moles of the ethylene glycol and 1,4-cyclohexanedimethanol is 80 mol % or wore, said polyester comprising a metal sulfonate group as a substituent of said acid components or said polyol components, said metal sulfonate group being present in an amount ranging from 0.1 to 5 mol % based on the total moles of said acid components or said polyol components, and wherein said polyester is soluble or dispersible in a solvent selected from the group consisting of cyclohexanone, isophorone, and mixtures thereof, and possesses a specific gravity at 30° C. in the range of 1.280 to 1.320.

* * * * *

UNITED STATES PATENT AND TRADEMARK OFFICE
CERTIFICATE OF CORRECTION

PATENT NO. : 5,563,236
DATED : October 8, 1996
INVENTOR(S) : Murata et al.

It is certified that error appears in the above-identified patent and that said Letters Patent is hereby corrected as shown below:

In Column 3, line 20: "leophotons" should read --isophorone--.

In Column 5, lines 7 and 8: "hisphenol" should read --bisphenol--.

IN THE CLAIMS:
In Claim 10, column 14, line 52: "east" should read --least--.

In Claim 10, column 14, line 54: "raid" should read --said--.

Signed and Sealed this

Fifteenth Day of April, 1997

Attest:

BRUCE LEHMAN

Attesting Officer     Commissioner of Patents and Trademarks